(12) United States Patent
Kang et al.

(10) Patent No.: US 12,315,060 B2
(45) Date of Patent: May 27, 2025

(54) METHOD AND APPARATUS FOR TRANSMITTING MOTION INFORMATION FOR METAVERSE CONCERT

(71) Applicant: ELECTRONICS AND TELECOMMUNICATIONS RESEARCH INSTITUTE, Daejeon (KR)

(72) Inventors: Kyung Kyu Kang, Daejeon (KR); Chang Joon Park, Daejeon (KR); Il Kwon Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 190 days.

(21) Appl. No.: 18/228,707

(22) Filed: Aug. 1, 2023

(65) Prior Publication Data
US 2024/0242412 A1    Jul. 18, 2024

(30) Foreign Application Priority Data
Jan. 17, 2023    (KR) .................... 10-2023-0006840

(51) Int. Cl.
G06T 13/40    (2011.01)
G06F 3/01    (2006.01)

(52) U.S. Cl.
CPC .............. *G06T 13/40* (2013.01); *G06F 3/011* (2013.01)

(58) Field of Classification Search
CPC ................................ G06T 13/40; G06F 3/011
See application file for complete search history.

(56) References Cited

U.S. PATENT DOCUMENTS 10,931,980 B2    2/2021    Bang et al.
12,254,548 B1 *  3/2025    Datta .................... G06T 13/205
(Continued)

FOREIGN PATENT DOCUMENTS

KR    10-1327995 B1    11/2013
KR    10-2167375 B1    10/2020
(Continued)

*Primary Examiner* — Yu Chen
(74) *Attorney, Agent, or Firm* — LRK PATENT LAW FIRM

(57) ABSTRACT

A method of transmitting motion information for metaverse concert includes: generating, by a performance directing system, original motion information including frames where performer's action is recorded; generating processed motion information having a lower frames per second (FPS) than the original motion information; generating verified motion information by extracting information on position on a part of performer's body in the original motion information; transmitting the verified motion information to an audience client system; receiving the verified motion information; generating, by the audience client system, restored motion information having the same FPS as the original motion information by adding predicted frames for the removed frames to the processed motion information; verifying whether there is an error in the restored motion information; modifying and supplementing the restored motion information when there is the error; and assigning motion to a virtual character based on the supplemented motion information.

13 Claims, 6 Drawing Sheets

(56) References Cited

U.S. PATENT DOCUMENTS

| | | | |
|---|---|---|---|
| 2013/0022130 A1 | 1/2013 | Alfonso et al. | |
| 2016/0232698 A1* | 8/2016 | Kim | G06F 3/04883 |
| 2020/0275134 A1 | 8/2020 | Bang et al. | |
| 2022/0167142 A1 | 5/2022 | Myong et al. | |
| 2024/0153226 A1* | 5/2024 | Izumi | G06T 19/20 |
| 2024/0338873 A1* | 10/2024 | Fukazawa | H04N 21/258 |

FOREIGN PATENT DOCUMENTS

| | | |
|---|---|---|
| KR | 10-2021-0081082 A | 7/2021 |
| WO | 2018/186516 A1 | 10/2018 |

\* cited by examiner

METHOD AND APPARATUS FOR TRANSMITTING MOTION INFORMATION FOR METAVERSE CONCERT

CROSS-REFERENCE TO RELATED APPLICATION

This application claims priority to and the benefit of Korean Patent Application No. 10-2023-0006840, filed in the Korean Intellectual Property Office on Jan. 17, 2023, the entire contents of which are incorporated herein by reference.

BACKGROUND

1. Field of the Invention

Technologies described below relate to a method and apparatus for transmitting motion information for a metaverse concert.

2. Description of Related Art

With the popularization of Metaverse services and the increase in demand for related technologies, metaverse technologies are developing. Metaverse is a compound word of "meta" and "universe" and refers to a virtual world that matches the real world. As a result, concerts are increasingly being held online within the metaverse.

Existing online concerts have been performed in a way of replaying pre-recorded concerts. Recently, however, concerts in which performers control virtual characters in real time have begun to emerge. In other words, there have been cases in which concerts are conducted in such a way that motion information is generated by measuring motions of performers, and the generated motion information is applied to virtual characters to control the virtual characters.

RELATED ART DOCUMENT

Patent Document

Korean Patent Publication No. 10-2167375

SUMMARY OF THE INVENTION

It is very important to reproduce natural dance movements in a concert in a way that the above-described virtual characters are controlled. In particular, when there is a team performer composed of multiple members, each member's dance should be reproduced harmoniously.

In the related art, motion information was streamed and applied to virtual characters. In this case, there was a case where errors occurred in the reproduced motion. This is because temporal and operational errors may occur while the streamed motion information is applied to the virtual characters. The temporal errors or operational errors may be caused by network delays.

The technology described below provides a method of preventing temporal and operational errors that may occur while streamed motion information is applied.

According to an exemplary embodiment, a method of transmitting motion information for a metaverse concert includes: generating, by a performance directing system, original motion information including a plurality of frames on which a performer's action is recorded; generating, by the performance directing system, processed motion information having a lower FPS than the original motion information by removing some frames from among the plurality of frames included in the original motion information; generating, by the performance directing system, verified motion information by extracting information on position on a part of a performer's body included in the original motion information; transmitting, by the performance directing system, the processed motion information and the verified motion information to an audience client system; receiving, by the audience client system, the processed motion information and the verified motion information; generating, by the audience client system, restored motion information having the same FPS as the original motion information by adding predicted frames for the removed frames to the processed motion information; verifying, by the audience client system, whether there is an error in the restored motion information by comparing the verified motion information with the restored motion information; modifying and supplementing, by the audience client system, the restored motion information when it is determined that there is the error; and assigning, by the audience client system, motion to a virtual character based on the supplemented restored motion information.

DETAILED DESCRIPTION OF EXEMPLARY EMBODIMENTS

The technology described below may be made with various changes and have various embodiments. The drawings in the specification may describe specific embodiments of the technology described below. However, this is for explanation of the technology described below and is not intended to limit the technology described below to specific embodiments. Therefore, it should be understood that all changes, equivalents, or substitutes included in the spirit and technical scope of the technology described below are included in the technology described below.

It should be understood that the singular expression in the term used below includes the plural expression unless the context clearly indicates otherwise, and it will be further understood that the terms "comprises" and "have" used in this specification, specify the presence of stated features, steps, operations, components, parts, or a combination thereof, but do not preclude the presence or addition of one or more other features, numerals, steps, operations, components, parts, or a combination thereof.

Prior to the detailed description of the drawings, it is intended to clarify that the components in this specification are only distinguished by the main functions of each component. That is, two or more components to be described below may be combined into one component, or one component may be divided into two or more for each subdivided function. In addition, each of the constituent parts to be described below may additionally perform some or all of the functions of other constituent parts in addition to the main functions of the constituent parts, and some of the main functions of the constituent parts may be performed exclusively by other components.

In addition, in performing the method or the operation method, each of the processes constituting the method may occur differently from the specified order unless a specific order is explicitly described in context. That is, the respective steps may be performed in the same sequence as the described sequence, be performed at substantially the same time, or be performed in a sequence opposite to the described sequence.

Hereinafter, the overall process of transmitting motion information for a metaverse concert will be described.

Figure 1:
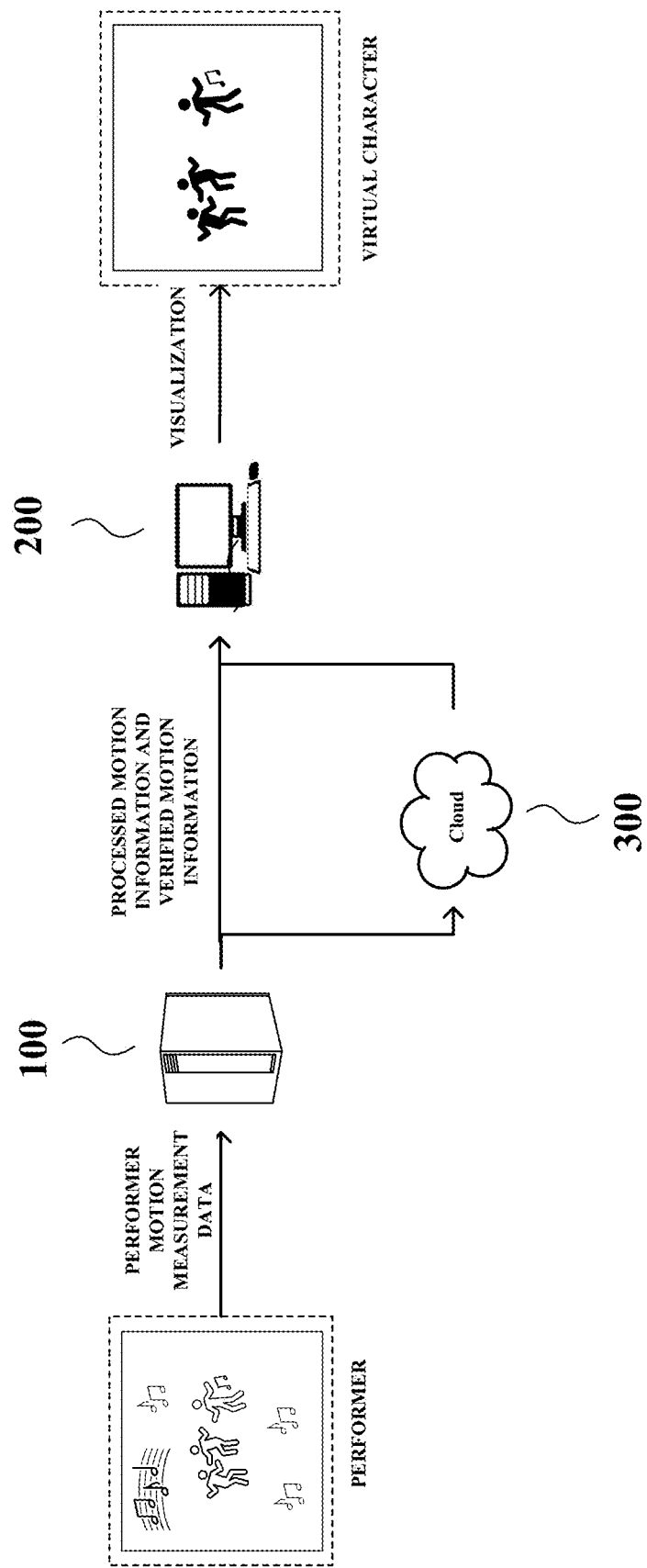
FIG. 1 is an overall process of transmitting motion information for a metaverse concert.

FIG. 1 is an overall process of transmitting motion information for a metaverse concert.

A method of transmitting motion information for a metaverse concert may be performed by a performance directing system 100 and an audience client system 200.

The performance directing system 100 may be a system that processes motion information and generates verification motion information.

The performance directing system 100 may generate original motion information including a plurality of frames on which a performer's action is recorded. The performance directing system 100 may generate processed motion information having lower frames per second (FPS) than the original motion information by removing some frames from among the plurality of frames included in the original motion information. The performance directing system 100 may generate verified motion information by extracting information on a position of a part of a performer's body included in the original motion information. The performance directing system 100 may transmit the processed motion information and the verified motion information to the audience client system.

The audience client system 200 may be a system that assigns motion to virtual characters based on the processed motion information and the verified motion information.

The audience client system 200 may receive the processed motion information and the verified motion information. The audience client system 200 may generate restored motion information having the same FPS as the original motion information by adding predicted frames for the removed frames to the processed motion information. The audience client system 200 may verify whether there is an error in the restored motion information by comparing the verified motion information with the restored motion information. When it is determined that there is an error, the audience client system 200 may modify and supplement the restored motion information. The audience client system 200 may assign motion to the virtual characters based on the supplemented restored motion information.

The performance directing system 100 may transmit the processed motion information and the verified motion information to a cloud server 300. In this case, the audience client system 200 may receive the processed motion information and the verified motion information from the cloud server 300. That is, the cloud server 300 may store the processed motion information and the verified motion information.

Hereinafter, the method of transmitting motion information for a metaverse concert will be described using the configuration of the performance directing system 100 and the audience client system 200.

Hereinafter, the performance directing system 100 will be described.

Figure 2:
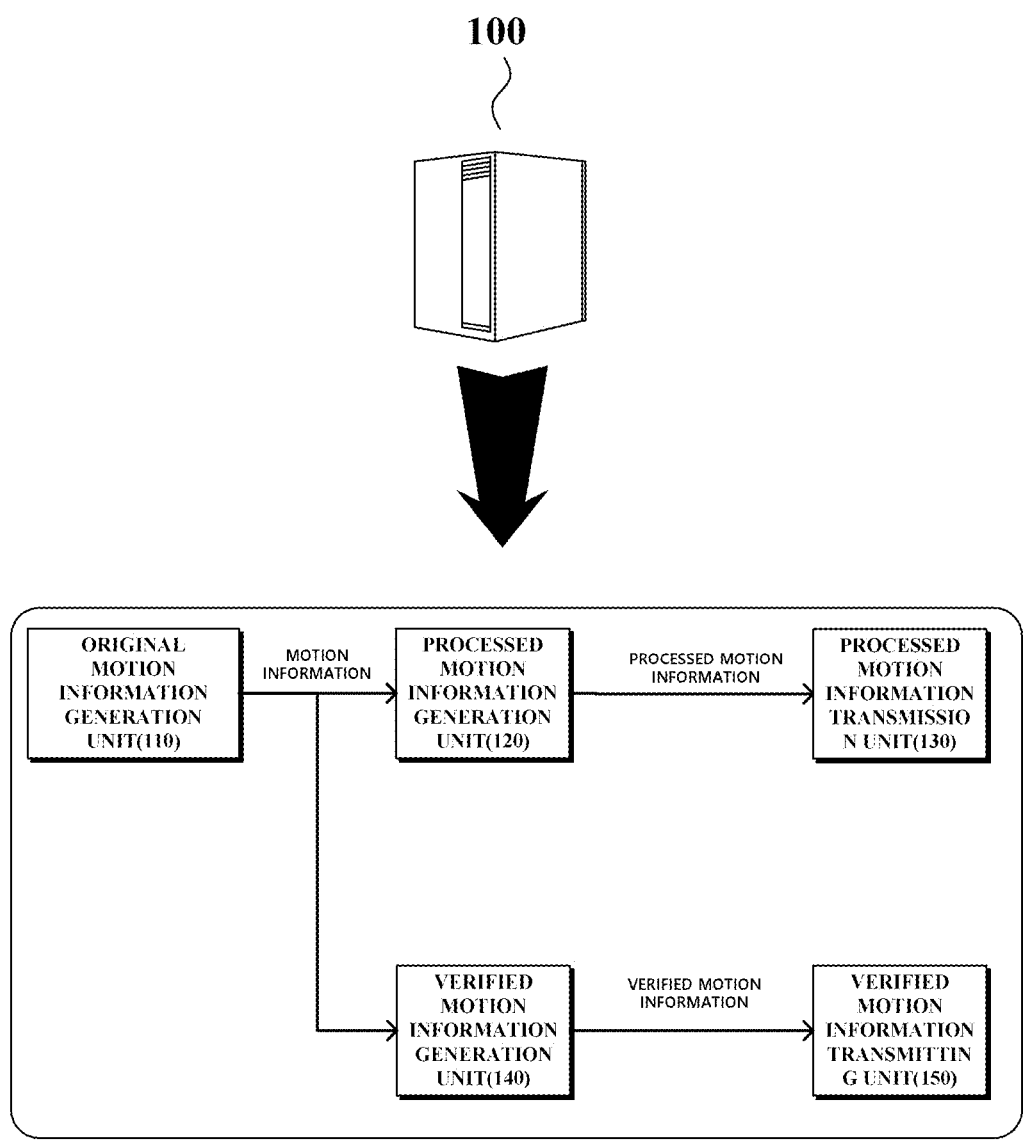
FIG. 2 is an example of the configuration of a performance directing system.

FIG. 2 is an example of the configuration of the performance directing system 100.

The performance directing system 100 may include an original motion information generation unit 110, a processed motion information generation unit 120, a processed motion information transmitting unit 130, a verified motion information generation unit 140, and a verified motion information transmitting unit 150.

The original motion information generation unit 110 may generate original motion information including a plurality of frames on which a performer's action is recorded. In other words, the original motion information generation unit 110 may generate motion information based on motion data of a performer. The performer's action or movement may be referred to as motion.

The motion information generated by the original motion information generation unit 110 may be referred to as original motion information.

A performer may be a person who performs a concert. The performer may be a single person or a team composed of a plurality of people. The performer may be performing a concert in an actual concert hall or a concert in a motion capture studio. The performer may be dancing at a concert.

The motion data of the performer may be data obtained by measuring the movement of a performer performing a concert. For example, the motion data of the performer may be data obtained by measuring whether the performer is currently rotating, bending the knee, stretching the back, waving the hand, or the like.

The motion data of the performer may be measured from a motion sensor. The motion sensor may be a sensor that measures a person's motion. In an embodiment, the motion sensor may include a gyro sensor, an acceleration sensor, or the like. The motion sensor may be attached to a body of a performer performing a concert.

The motion data of the performer may be an image captured by an image capturing device. The motion information generation unit may generate motion information using an image analysis model. The image analysis model may be a model trained in advance.

The original motion information may be information on which a performer's action is recorded.

The original motion information may include information of a performer performing a concert, a skeleton state of the performer, and frame information.

The information of the performer may include information for identifying a performer performing a current performance. For example, when a performer performing a concert is a team composed of a plurality of people, an ID may be assigned to each person to distinguish the plurality of people.

The frame information may include information on how many motions the motion information has per second. In other words, the frame information may include FPS information of motion information. For example, the frame information may include information indicating that the motion information has 60 motions per second (60 FPS).

Alternatively, the frame information may include information on which frame the performer's specific action (or skeleton state of a performer) was performed. For example, when the motion information generation unit generates motion information having a length of 3 seconds at 60 FPS, an order (Frame: 1 to Frame: 180) may be assigned to a total of 180 frames. Accordingly, it is possible to determine which motion was performed in what number of frames.

The processed motion information generation unit 120 may generate processed motion information having a lower FPS than the original motion information by removing some frames from among a plurality of frames included in the original motion information. In other words, the processed motion information generation unit 120 may process the original motion information into motion information having different FPS.

The motion information processed by the processed motion information generation unit 120 may be referred to as processed motion information.

The reason why the processed motion information generation unit 120 processes the motion information is to transmit motion information suitable for network speed by varying the size of the motion information.

For example, the processed motion information generation unit 120 may process original motion information having 60 FPS into 60 FPS (high size), 30 FPS (medium size), or 15 FPS (low size). Processed motion information having 30 FPS may have half the size of initial motion information. Therefore, the transmission time is small. Processed motion information having 15 FPS may have ¼ size of initial motion information. Therefore, the transmission time is very small.

However, since the processed motion information has a low FPS, it does not give motion to characters well. Therefore, a process of restoring the processed motion information to have a high FPS is required. This will be described in the restoration unit 220 of the audience client system 200.

The processed motion information transmitting unit 130 may transmit the processed motion information to the audience client system 200 or the cloud server 300.

The processed motion information transmitting unit 130 may transmit all processed motion information to the cloud server 300. For example, when the processed motion information generation unit 120 generates processed motion processing information having 10 FPS, 20 FPS, 30 FPS, 40 FPS, and 50 FPS from original motion information having 60 FPS, the processed motion information transmitting unit 130 may transmit all the processed motion processing information to the cloud server 300.

The processed motion information transmitting unit 130 may also transmit the original motion information to the audience client system 200 or the cloud server 300.

The verified motion information generation unit 140 may generate verified motion information by extracting information on a position of a part of a performer's body included in the original motion information.

The verified motion information may be used when determining whether the motion information received or restored by the audience client system 200 is normal. This is because the motion information may be damaged for various reasons while being transmitted to the audience client system 200, or may be incorrectly restored while the audience client system 200 restores the motion information.

The verified motion information of the performer may be geometric information that may be derived from the original motion information. In other words, a part of the performer's body may mean a part of the body. For example, the verified motion information may include only information on positions of head, hands, torso, and feet of the performer's body.

The verified motion information may have a smaller size than the original motion information. As described above, this is because the verified motion information includes only information on a position of a part of the performer's body.

The verified motion information may include only information that plays an important role in restoring virtual character motion. For example, the verified motion information may include only information on positions of hands and feet of a performer in the original motion information. This is because, when there is an error in the position of the hands and feet, a user may feel that virtual characters are unnatural.

The verified motion information may have the same FPS as the original motion information. Since the verified motion information is used to determine whether the processed motion information having a lower FPS than the original motion information is well restored, the FPS does not need to be changed.

The verified motion information transmitting unit 150 may transmit the verified motion information to the audience client system 200 or the cloud server 300.

The verified motion information is important data. The verified motion information should not be damaged during transmission and reception. Therefore, the verified motion information transmitting unit 150 may use a secure network session without loss of information during transmission and reception for accurate transmission.

Hereinafter, the motion information generated by the performance directing system 100 will be described in detail.

Figure 3:
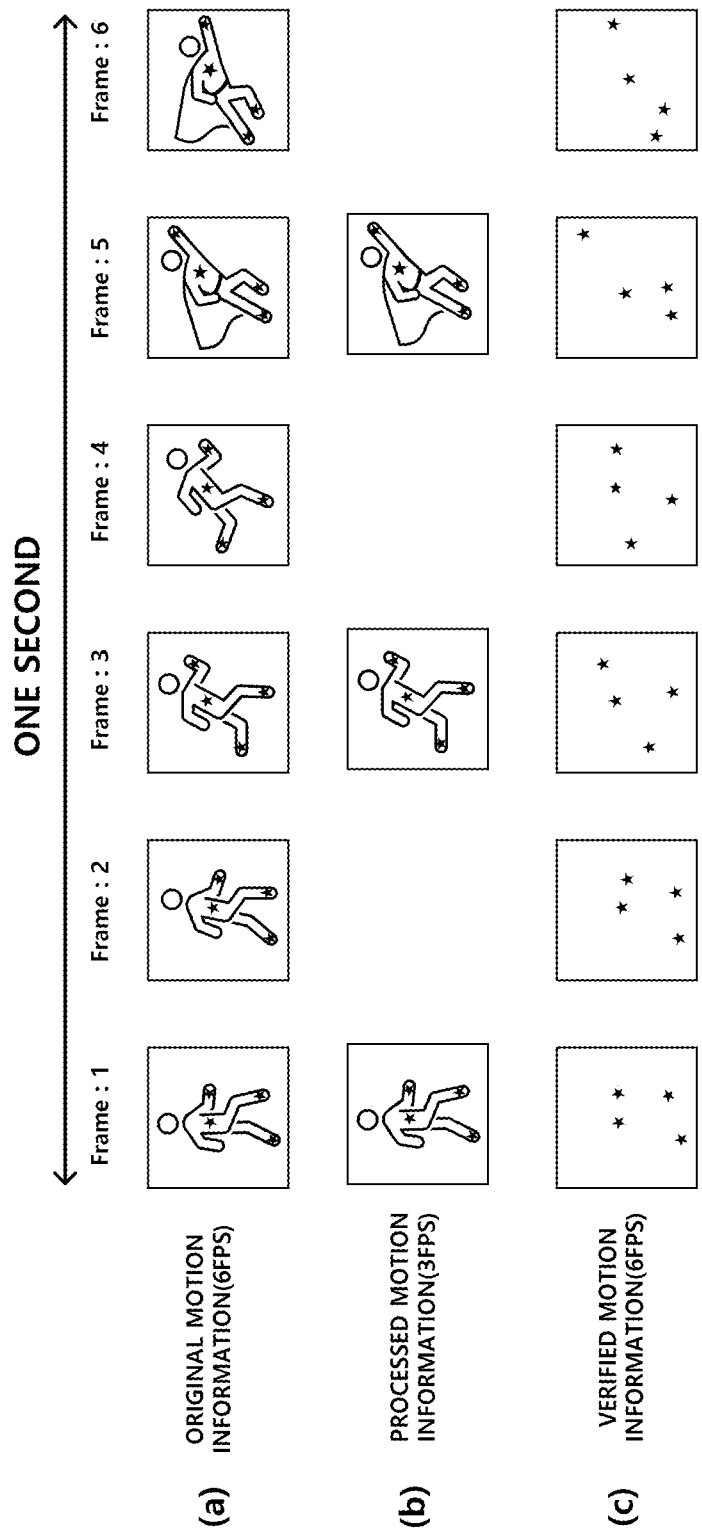
FIG. 3 is examples of motion information generated by the performance directing system.

FIG. 3 is examples of the motion information generated by the performance directing system 100. A performer conducts a motion of walking and then flying.

FIG. 3(*a*) is the original motion information generated by the original motion information generation unit 110. The original motion information has 6 FPS. Therefore, the original motion information has 6 motions per second.

FIG. 3(*b*) illustrates the processed motion information processed by the processed motion information generation unit 120. The processed motion information is obtained by removing some frames from the original motion information. Accordingly, the processed motion information has 3 FPS. Therefore, the processed motion information has 3 motions per second. The processed motion information has ½ size of the original motion information.

FIG. 3(*c*) illustrates the verified motion information generated by the verified motion information generation unit 140. The verified motion information has information (stars in the drawing) on positions of hands, feet and torso of a performer. The verified motion information has the same 6 FPS as the original motion information. The verified motion information has the same FPS as the original motion information, but has a relatively small size compared to the original motion information because it has the information on the positions of the hands, feet, and torso of the performer.

Hereinafter, the audience client system 200 will be described.

Figure 4:
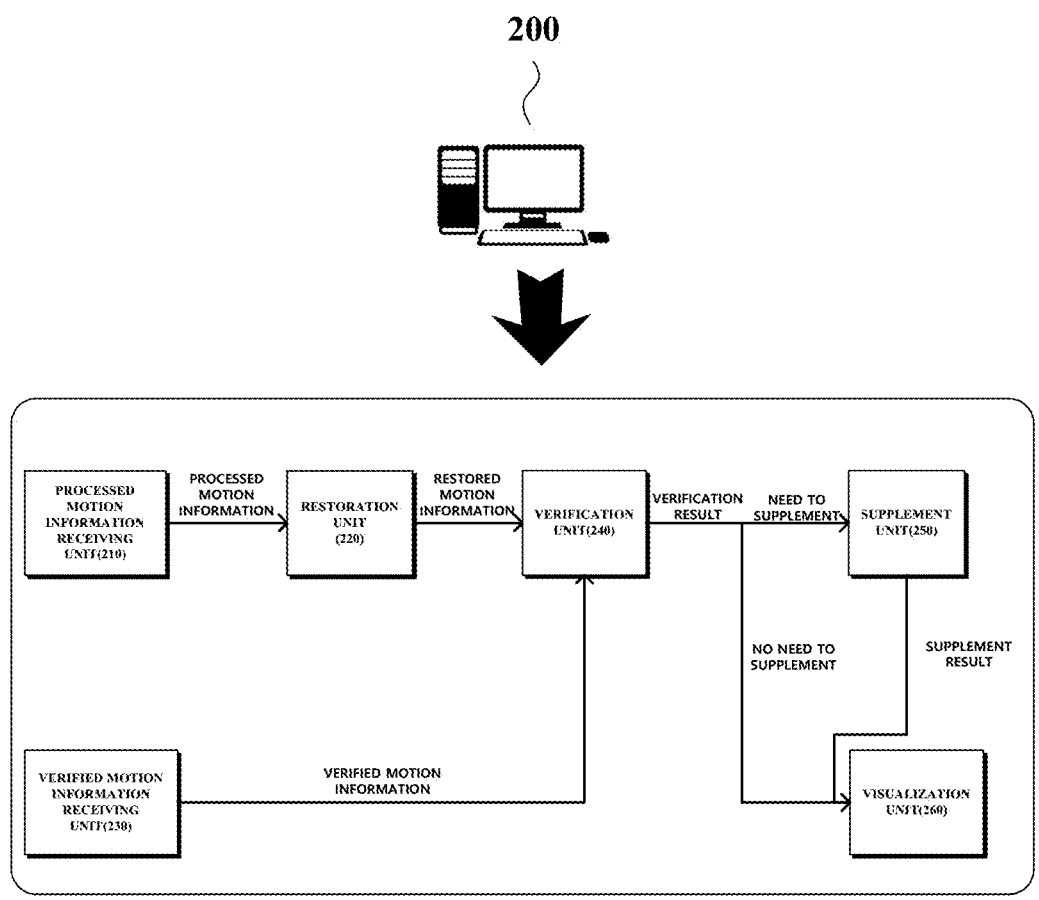
FIG. 4 is an example of a configuration of an audience client system.

FIG. 4 is an example of the configuration of the audience client system 200.

The audience client system 200 may include a processed motion information receiving unit 210, a restoration unit 220, a verified motion information receiving unit 230, a verification unit 240, a supplement unit 250, and a visualization unit 260.

The processed motion information receiving unit 210 may receive the processed motion information.

The processed motion information receiving unit 210 may receive the processed motion information from the performance directing system 100.

Alternatively, the processed motion information receiving unit 210 may receive the processed motion information from the cloud server 300.

The processed motion information receiving unit 210 may receive the processed motion information of which a size varies according to a network transmission rate. In other words, the processed motion information receiving unit may receive processed motion information having an appropriate FPS.

For example, when the network transmission rate increases, the processed motion information receiving unit 210 may receive processed motion information having a high FPS. On the other hand, when the network transmission rate decreases, the processed motion information receiving unit 210 may receive processed motion information having a low FPS. When the network transmission rate is very high, the processed motion information receiving unit 210 may receive original motion information instead of the processed motion information.

An administrator may set in advance which FPS to receive the processed motion information according to the network transmission rate. For example, when processed motion information is previously set to be received within 1 second, the processed motion information with a size that may be received within 1 second may be received.

The restoration unit 220 may generate restored motion information having the same FPS as the original motion information by adding the predicted frames for the frames removed by the performance directing system to the processed motion information. In other words, the restoration unit 220 may restore the FPS of the processed motion information to be the same as the FPS of the original motion information.

The motion information restored by the restoration unit 220 may be referred to as the restored motion information.

The motion information having a low FPS has a small size and is easy to be transmitted. However, the motion information having a low FPS may not be directly applied to virtual characters. This is because the virtual characters look unnatural due to the low FPS.

The predicted frame may refer to a prediction of a frame removed by the processed motion information generation unit 120 of the performance directing system 100. The predicted frame may be generated by calculating a median value of a frame before and after the removed frame.

For example, when the original motion information has 60 FPS and the processed motion information has 15 FPS, the restoration unit 220 may restore the processed motion information to have 60 FPS. When the original motion information is 1 second, the restoration unit 220 may predict 45 frames to generate restored motion information. This is because 45 pieces of motion information were deleted while the processed motion information generation unit 120 generated the processed motion information.

When the difference between the FPS of the processed motion information and the FPS of the original motion information is small, the restoration unit 220 may not perform restoration. As a result, it is possible to reduce the amount of calculation.

The verified motion information receiving unit 230 may receive the verified motion information.

The verified motion information receiving unit 230 may receive the processed motion information from the performance directing system 100. Alternatively, the verified motion information receiving unit 230 may receive the verified motion information from the cloud server 300.

The verified motion information receiving unit 230 may receive the verified motion information through a stable network. This is because the verified motion information is used for verification, so there should be no loss during the transmission.

The verification unit 240 may verify whether there is an error in the restored motion information by comparing the verified motion information with the restored motion information. In other words, the verification unit 240 may verify the restored motion information using the verified motion information.

The reason why the verification unit 240 performing the verification is that loss or error may occur while the processed motion information is transmitted and received. Alternatively, this is because an error may occur while the restoration unit 220 performs the restoration.

An error means a case where the restored motion information differs greatly from the verified motion information. When there is an error, the restored motion information is very different from the original motion information. Therefore, if there is an error, the virtual characters may be given wrong movement.

When it is determined that there is no error according to a result of the verification, the verification unit 240 may transmit the restored motion information to the visualization unit 260.

When it is determined that there is an error according to a result of the verification, the verification unit 240 may transmit the restored motion information and error contents to the supplement unit 250.

In one embodiment, the verification unit 240 may predict the positions of the hands, feet, and center of gravity from the restored motion information and then compare the positions with the verified motion information. The verification unit 240 may calculate the positional difference between the hands, feet, and center of gravity based on the comparison result. The verification unit 240 may determine that an error has occurred if the calculated positional difference is greater than a predetermined criterion. Accordingly, the verification unit 240 may transmit the restored motion information and the calculated positional difference to the supplement unit 250.

The supplement unit 250 may modify and supplement the restored motion information. In other words, the supplement unit 250 may modify the restored motion information to remove the errors in the restored motion information.

As an embodiment, the supplement unit 250 may modify the restored motion information to minimize the difference between the verified motion information and the restored motion information. For example, the restored motion information may be modified to minimize the positional difference between the hands, feet, and center of gravity of the verified motion information and the positional difference in the restored motion information.

In one embodiment, the supplement unit 250 may perform an inverse kinematics solution for modification. The supplement unit 250 may calculate a joint angle of the virtual character through the inverse kinematics solution based on the information on the position included in the verified motion information. The supplement unit may modify the restored motion information based on the calculated joint angle.

The visualization unit 260 may apply the restored motion information to the virtual character to assign motion to the virtual character.

The virtual character may be a character within the metaverse. For example, the virtual character may be an avatar.

The virtual character may move based on the motion information. Since the motion information is derived from a performer, the motion of the virtual character may be similar to that of the performer.

The virtual character may have a plurality of joints. Accordingly, the visualization unit 260 may assign motion to the virtual characters by using the joint angle information included in the restored motion information.

When the processed motion information receiving unit 210 receives the original motion information because the network condition is good, the visualization unit may use the original motion information to assign motion to the virtual character.

Hereinafter, the motion information used by the audience client system 200 will be described in detail.

Figure 5:
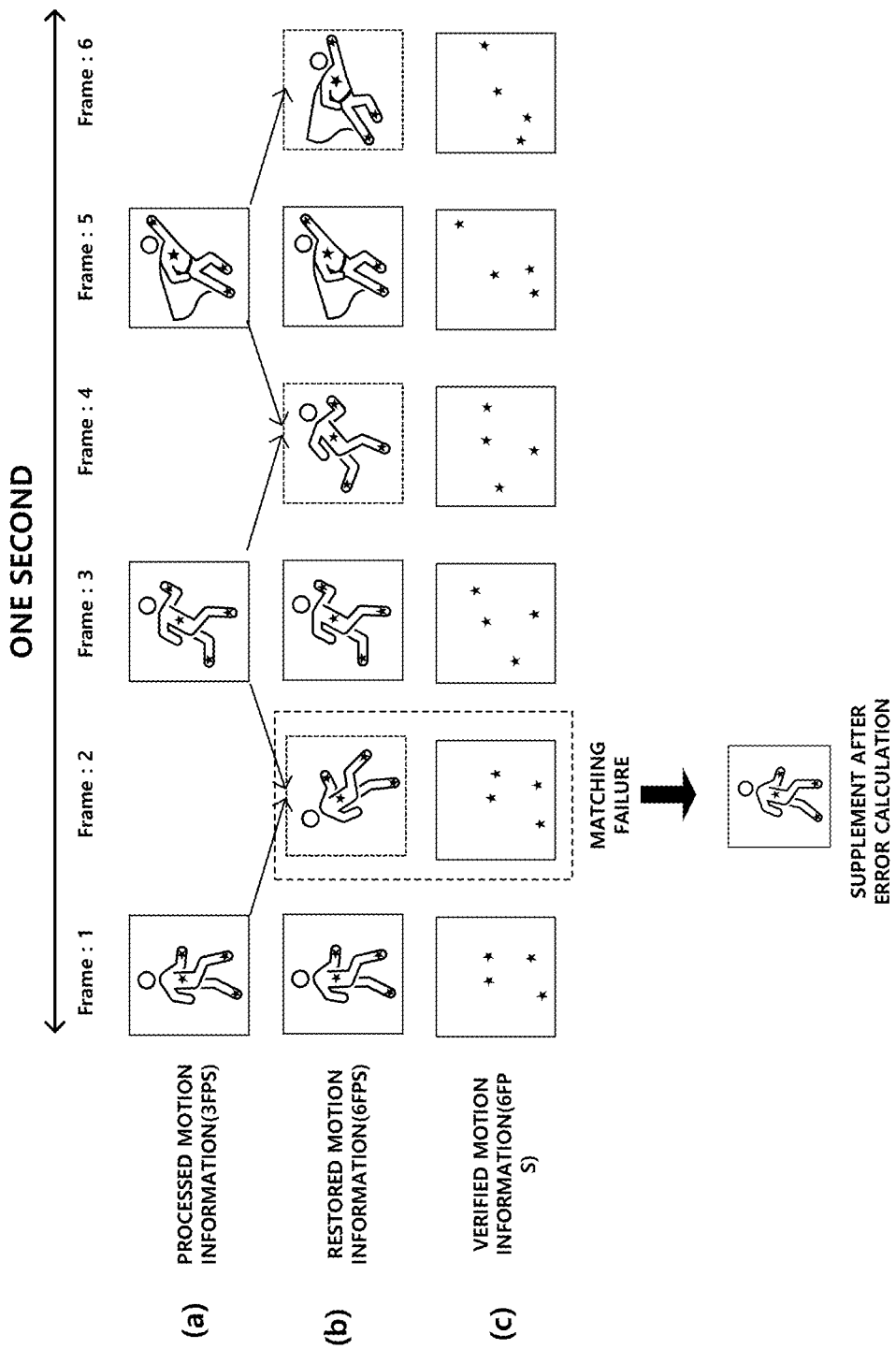
FIG. 5 is examples of motion information used by an audience client.

FIG. 5 is examples of the motion information used by the audience client system 200.

FIG. 5(a) illustrates the processed motion information received by the processed motion information receiving unit 210. The processed motion information has 3 FPS. Therefore, the processed motion information has 3 motions for 1 second.

FIG. 5(b) illustrates the restored motion information restored by the restoration unit 220. The restored motion information has 6 FPS. Therefore, the restored motion information has 6 motions for 1 second. The predicted frame was calculated based on the previous frame and the next frame of the removed frame.

FIG. 5(c) illustrates the verified motion information received by the verified motion information receiving unit 230. The verified motion information has 6 FPS. Therefore, the verified motion information has 6 motions for 1 second. The verified motion information has the information (stars in the drawing) on the positions of the hands, torso, and feet of the performer.

The verification unit 240 compares the restored motion information (FIG. 5(b)) and the verified motion information (FIG. 5(c)). The verification unit 240 may confirm that the second frame does not match as a result of the comparison. In this case, the verification unit 240 may transmit the restored motion information and an error value to the supplement unit 250. The supplement unit 250 may modify the motion information to minimize the error.

Hereinafter, the metaverse concert apparatus will be described.

Figure 6:
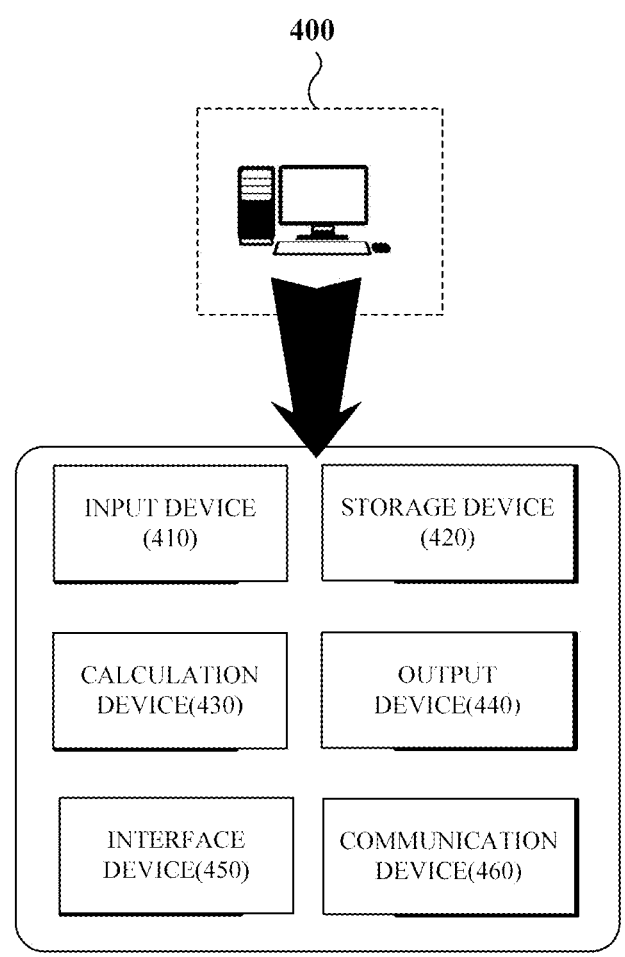
FIG. 6 is an example of a motion information transmission device for a metaverse concert.

FIG. 6 is an example of a metaverse concert apparatus 400.

The metaverse concert apparatus 400 may be the audience client system 200 described in FIGS. 1 and 4.

The metaverse concert apparatus 400 may be physically implemented in various forms such as a PC, a laptop computer, a smart device, a virtual reality device, and an augmented reality device.

The metaverse concert apparatus 400 may include an input device 410, a storage device 420, a calculation device 430, an output device 440, an interface device 450, and a communication device 460.

The input device 410 may include an interface device (keyboard, mouse, touch screen, etc.) that receives certain commands or data. The input device 410 may include a component for receiving information through a separate storage device (a universal serial bus (USB), a compact disk (CD), a hard disk, etc.). The input device 410 may receive input data through a separate measuring device or through a separate DB. The input device 410 may receive data through wired or wireless communication.

The input device 410 may receive original motion information, processed motion information, and verified motion information. The input device 410 may receive input of virtual characters.

The storage device 420 may store information input through the input device 410. The storage device 420 may store information generated during the calculation by the calculation device 430. That is, the storage device 420 may include a memory. The storage device 420 may store the result calculated by the calculation device 430.

The calculation device 430 may perform calculations necessary to implement a metaverse concert. That is, the calculation device 430 may perform calculations performed by each component of the audience client system 200 of FIG. 4.

The calculation device 430 may generate the restored motion information having the same FPS as the original motion information by adding the predicted frames for the removed frames to the processed motion information. The calculation device 430 may verify whether there is an error in the restored motion information by comparing the verified motion information with the restored motion information. When it is determined that there is an error, the calculation device 430 may modify and supplement the restored motion information. The calculation device 430 may assign motion to the virtual character based on the supplemented restored motion information.

The output device 440 may be a device that outputs certain information. The output device 440 may output an interface required for data processing, input data, analysis results, and the like. The output device 440 may be physically implemented in various forms, such as a display, a device that outputs documents, and the like. The output device 440 may output virtual characters to which motion is assigned.

The interface device 450 may be a device that receives certain commands and data from the outside. The interface device 450 may receive conversation information from a physically connected input device or an external storage device. The interface device 450 may receive a control signal for controlling the metaverse concert apparatus 400. The interface device 450 may output the results analyzed by the metaverse concert apparatus 400.

The communication device 460 may be a component that receives and transmits certain information through a wired or wireless network. The communication device 460 may receive a control signal required to control the metaverse concert apparatus. The communication device 460 may transmit or receive the processed motion information and the verification motion information. The communication device 460 may transmit or receive the processed motion information and the verified motion information to a cloud server.

The above-described motion information transmission method for a metaverse concert may be implemented as a program (or application) including an executable algorithm that may be executed on a computer.

The program may be stored and provided in a non-transitory computer readable medium.

The non-transitory computer-readable medium is not a medium that stores data therein for a while, such as a register, a cache, a memory, or the like, but means a medium that semi-permanently stores data therein and is readable by an apparatus. Specifically, various applications or programs described above may be provided by being stored in non-transitory readable media such as a CD, a digital video disk (DVD), a hard disk, a Blu-ray disk, a USB, a memory card, a read-only memory (ROM), a programmable read only memory (PROM), an erasable PROM (EPROM), an electrically EPROM (EEPROM), or a flash memory.

The transitory readable media refer to various RAMs such as a static RAM (SRAM), a dynamic RAM (DRAM), a synchronous DRAM (SDRAM), a double data rate SDRAM (DDR SDRAM), an enhanced SDRAM (ESDRAM), a synclink DRAM (SLDRAM), and a direct rambus RAM (DR-RAM).

According to the technology described above, it is possible to detect temporal/spatial errors that can occur when motion information is received and reproduced through streaming.

According to the technology described above, it is possible to transmit and receive motion information having low frames per second (FPS) by processing original motion information. As a result, it is possible to shorten a transmission/reception time.

According to the technology described above, even when motion information having a low FPS is received, it is possible to restore and use the motion information.

According to the technology described above, it is possible to verify a loss that can occur when transmitting and receiving motion information or an error that can occur when restoring motion information.

The present embodiment and the drawings attached to the present specification only clearly show some of the technical ideas included in the above-described technology, and therefore, it will be apparent that all modifications and specific embodiments that can be easily inferred by those skilled in the art within the scope of the technical spirit included in the specification and drawings of the above-described technology are included in the scope of the above-described technology.

What is claimed is:

1. A performance directing system comprising:
an original motion information generation unit configured to generate original motion information including a plurality of frames on which a performer's action is recorded;
a processed motion information generation unit configured to remove some frames from among the plurality of frames included in the original motion information to generate processed motion information having lower frames per second (FPS) than the original motion information;
a processed motion information transmitting unit configured to transmit the processed motion information to an audience client system or a cloud server;
a verified motion information generation unit configured to extract information on a position of a part of a performer's body included in the original motion information and generate verified motion information; and
a verified motion information transmitting unit configured to transmit the verified motion information to the audience client system or the cloud server.

2. The performance directing system of claim 1, wherein the original motion information includes information on the performer, a skeleton state of the performer, and frame information.

3. The performance directing system of claim 1, wherein the verified motion information includes information on positions of hands and feet of the performer.

4. The performance directing system of claim 1, wherein the processed motion information generation unit generates a plurality of pieces of processed motion information having different FPS.

5. The performance directing system of claim 1, wherein the verified motion information transmitting unit transmits the verified motion information using a network without loss of information during a transmission and reception process.

6. An audience client system comprising:
a processed motion information receiving unit configured to receive, from a performance directing system or a cloud server, processed motion information having lower frames per second (FPS) than an original motion information by removing some frames from among a plurality of frames included in the original motion information;
a restoration unit configured to generate restored motion information having the same FPS as the original motion information by adding predicted frames for the removed frames to the processed motion information;
a verified motion information receiving unit configured to receive verified motion information generated by extracting information on position on a part of a performer's body included in the original motion information from the performance directing system or the cloud server;
a verification unit configured to verify whether there is an error in the restored motion information by comparing the verified motion information with the restored motion information;
when it is determined that there is the error according to a result of the verification, a supplement unit configured to modify and supplement the restored motion information; and
a visualization unit configured to assign motion to a virtual character based on the supplemented restored motion information.

7. The audience client system of claim 6, wherein the processed motion information receiving unit receives processed motion information of which a size varies according to a network transmission rate.

8. The audience client system of claim 6, wherein the restoration unit predicts the removed frames by calculating median values of frames before and after the removed frames.

9. The audience client system of claim 6, wherein the verified motion information receiving unit receives the verified motion information using a network without loss of information during a transmission and reception process.

10. The audience client system of claim 6, wherein the verification unit calculates a difference between the information on position of the verified motion information and the information on position of the performer's body included in the restored motion information, and then, when the calculated difference value is greater than or equal to a preset reference value, determines that there is an error in the verified motion information determine.

11. The audience client system of claim 6, wherein the supplement unit modifies the restored motion information by calculating information on a joint angle of the virtual character by solving inverse kinematics based on the information on position of the verified motion information.

12. The audience client system of claim 6, wherein the visualization unit calculates a joint angle of the virtual character based on the supplemented motion information and then applies the calculated joint angle to the virtual character to assign motion to the virtual character.

13. A method of transmitting motion information for a metaverse concert, comprising:

generating, by a performance directing system, original motion information including a plurality of frames on which a performer's action is recorded;

generating, by the performance directing system, processed motion information having a lower frames per second (FPS) than the original motion information by removing some frames from among the plurality of frames included in the original motion information;

generating, by the performance directing system, verified motion information by extracting information on position on a part of a performer's body included in the original motion information;

transmitting, by the performance directing system, the processed motion information and the verified motion information to an audience client system;

receiving, by the audience client system, the processed motion information and the verified motion information;

generating, by the audience client system, restored motion information having the same FPS as the original motion information by adding predicted frames for the removed frames to the processed motion information;

verifying, by the audience client system, whether there is an error in the restored motion information by comparing the verified motion information with the restored motion information;

modifying and supplementing, by the audience client system, the restored motion information when it is determined that there is the error; and assigning, by the audience client system, motion to a virtual character based on the supplemented restored motion information.

\* \* \* \* \*